(12) United States Patent
Prebble

(10) Patent No.: US 8,782,094 B2
(45) Date of Patent: Jul. 15, 2014

(54) SYSTEMS AND METHODS FOR MANAGING DATA IN COMPLEX CONTAINERS

(75) Inventor: Tim Prebble, Longmonl, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 830 days.

(21) Appl. No.: 12/571,111

(22) Filed: Sep. 30, 2009

(65) Prior Publication Data

US 2011/0075217 A1 Mar. 31, 2011

(51) Int. Cl.
| | | |
|---|---|---|
| G06F 17/30 | (2006.01) | |
| G06F 12/00 | (2006.01) | |
| G06F 13/00 | (2006.01) | |
| G06F 12/02 | (2006.01) | |

(52) U.S. Cl.
CPC .................................... *G06F 12/023* (2013.01)
USPC ............................ 707/802; 711/170; 713/100

(58) Field of Classification Search
None
See application file for complete search history.

(56) References Cited

U.S. PATENT DOCUMENTS

| | | | | |
|---|---|---|---|---|
| 5,784,619 | A * | 7/1998 | Evans et al. ................... | 719/328 |
| 6,006,019 | A * | 12/1999 | Takei ............................. | 709/224 |
| 6,493,740 | B1 * | 12/2002 | Lomax .......................... | 718/107 |
| 6,850,999 | B1 * | 2/2005 | Mak et al. ....................... | 710/39 |
| 6,910,038 | B1 * | 6/2005 | James ............................... | 1/1 |
| 7,817,652 | B1 * | 10/2010 | MacAdam et al. ............ | 370/412 |
| 2002/0072830 | A1 * | 6/2002 | Hunt ................................. | 701/1 |
| 2002/0141410 | A1 * | 10/2002 | Beshenar et al. .............. | 370/392 |
| 2005/0088685 | A1 * | 4/2005 | Lee ............................... | 358/1.15 |
| 2006/0069859 | A1 * | 3/2006 | Hayasaka ...................... | 711/112 |
| 2009/0307378 | A1 * | 12/2009 | Allen et al. ........................ | 710/4 |

* cited by examiner

*Primary Examiner* — Tarek Chbouki
(74) *Attorney, Agent, or Firm* — Osha Liang LLP

(57) ABSTRACT

Systems and methods for managing data in complex containers permit atomic addition of a plurality of data items to the containers. Each data item can occupy contiguous memory locations, although the plurality of data items may be mutually discontiguous. The method comprises creating a package object, which comprises an externally accessible array of pointer and associated integers. Each pointer points to the start of a memory location holding a distinct data item and the associated integer represents the size of the data item referenced by the pointer. A function associated with an external interface of the container determines a quantity of memory to hold the plurality of data items and invokes an externally accessible write function in the package object to add the plurality of individual data items to the container at specified locations if there is adequate memory available to hold the plurality of data items.

19 Claims, 4 Drawing Sheets

SYSTEMS AND METHODS FOR MANAGING DATA IN COMPLEX CONTAINERS

BACKGROUND

1. Technical Field

The present disclosure pertains to the field of memory management and in particular, to systems and methods for managing data in complex memory containers.

2. Description of Related Art

Document processing software, database management systems, computer graphics, document printing, and other software applications often use complex memory containers to hold data for processing. These complex containers, which can include code and data, permit representation of multiple relationships between various objects (or portions of these objects) that are held in the containers.

For example, during document processing Page Description Language ("PDL") descriptions, which provide a high-level portrayal of each page in a document, may be parsed and converted to an intermediate form—termed a display list—prior to rasterization. The display list ("DL"), which can hold objects, including commands called display list primitives, is a type of complex container with an elaborate data structure. In some instances, the DL may be comprised of a linked list of linked lists, with the nodes of the latter referencing memory blocks, which, in turn, may contain data from multiple graphical objects. Partly on account of this complexity, the internal structure of complex containers (such as the display list) is typically hidden from its clients and the complex container (hereinafter "container") may provide an external functional interface to clients to add entire objects, or object data to the container. The functional interface often specifies that the object or object portions to be added to the container be placed in a contiguous memory block prior to invocation of the functional interface.

In some instances, however, such as during print data processing, specific portions of graphical objects, which are not contiguous in memory, may be selected for addition to the display list. In other words, each portion of the graphical object selected for addition to the DL may reside in a memory location that is not contiguous with any other selected portion of the same graphical object i.e. the object portions are mutually discontiguous.

In traditional schemes, when non-contiguous portions of graphical objects are selected for addition to a DL, the DL functional interface may be called multiple times to add each distinct portion. In such situations, it becomes difficult for the program code associated with the DL functional interface to guarantee the atomicity of the transaction as a whole. For example, memory may be unavailable after one portion of the graphical object has been written to the DL.

Another approach calls the functional interface associated with the DL to add the entire graphical object to the DL. However, adding the entire graphical object to the DL can be an extremely inefficient use of memory resources because the portions of the graphical object selected for addition to the DL may be small in size relative to the size of the entire object. A third approach copies the selected portions of the graphical object in sequence into a contiguous memory block and prior to invoking the functional interface to add the memory block to the DL. The additional copy step contributes to processing delays.

In general, conventional schemes for the addition of mutually discontiguous data items to complex containers in a given order use memory inefficiently, may be slow, and/or incapable of guaranteeing the atomicity of the entire transaction.

Thus, there is a need for systems and methods to efficiently allow the addition of non-contiguous data items to containers while guaranteeing the atomicity of the entire transaction.

SUMMARY

Consistent with disclosed embodiments, systems and methods for atomically adding a plurality of data items to complex containers are disclosed. Each individual data item can occupy physically contiguous memory locations, while the individual data items that comprise the plurality of data items may be mutually discontiguous. In some embodiments, a method for atomically adding a plurality of individual data items to a complex container can comprise: creating a package object, which comprises: an externally accessible array comprising of pointer-integer pairs, wherein each pointer points to the start of a memory location for a distinct individual data item and each pointer is associated with an externally accessible integer that represents the size of the data item referenced by the pointer. The package can also comprise an externally accessible size function that provides the cumulative size of the plurality of individual data items, and an externally accessible write function that writes the individual data items in sequence to a destination address, the sequence being determined by the order in which pointers that reference the data item appear in the array. The method further comprises invoking a function associated with an external interface of the complex container, wherein the function: determines a quantity of memory to hold the plurality of data items, and invokes the externally accessible write function to add the plurality of individual data items to the container at locations supplied by the external interface, if the memory available to hold the plurality of data items is not less than the determined quantity of memory.

Embodiments disclosed also relate to methods created, stored, accessed, or modified by processors using computer-readable media or computer-readable memory. These and other embodiments are further explained below with respect to the following figures.

DETAILED DESCRIPTION

Figure 1:
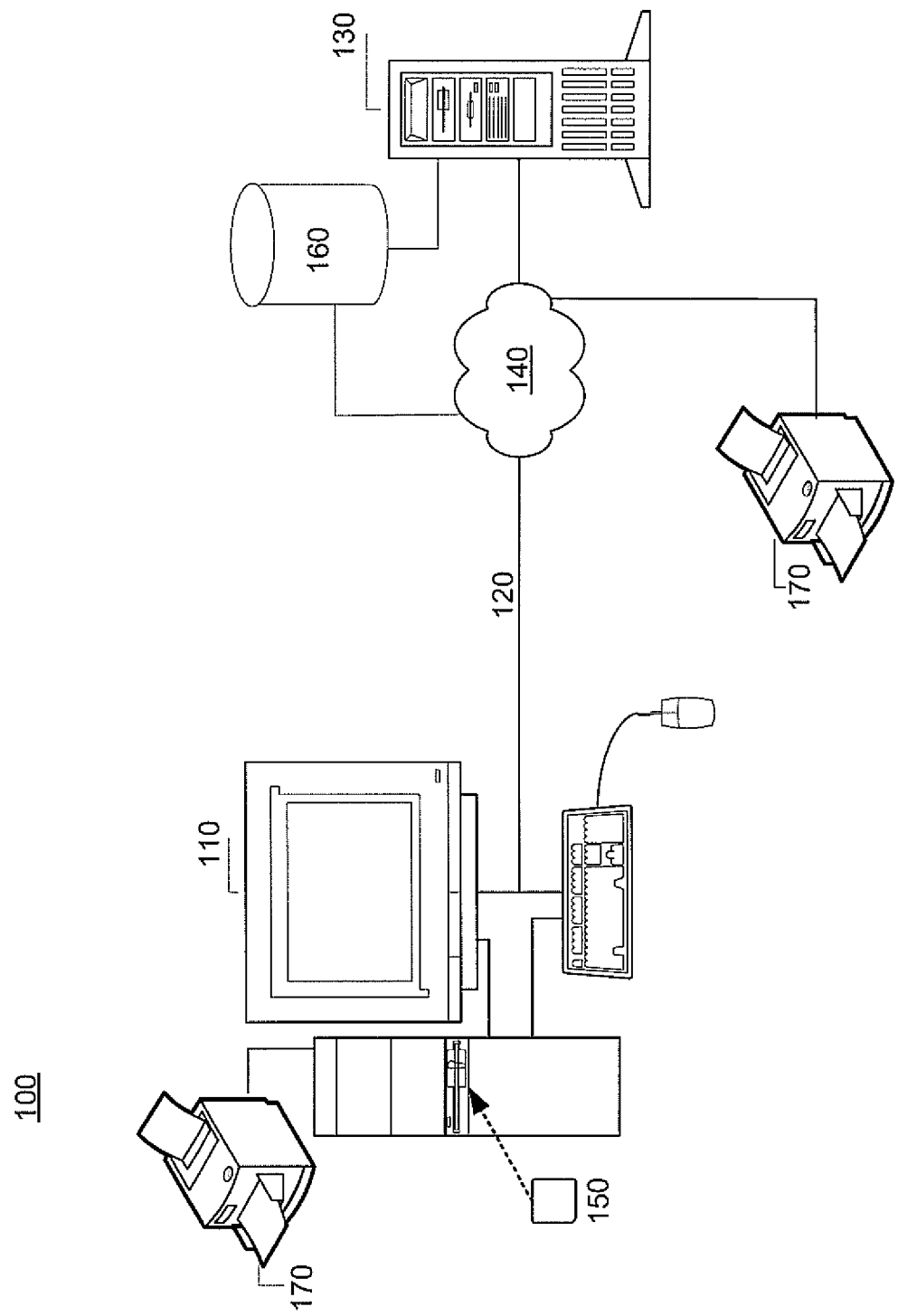
FIG. 1 shows a block diagram illustrating components in a system for printing documents.

In accordance with embodiments reflecting various features of disclosed embodiments, systems and methods for managing data in complex container are presented. FIG. 1 shows a block diagram illustrating components in an exemplary computer system capable of running applications capable of using and managing data in complex containers. A computer software application consistent with disclosed embodiments may be deployed on a network of computers, as shown in FIG. 1, that are connected through communication links that allow information to be exchanged using conventional communication protocols and/or data port interfaces.

As shown in FIG. 1, exemplary system 100 includes computers including a computing device 110 and a server 130. Further, computing device 110 and server 130 may communicate over a connection 120, which may pass through network 140, which in one case could be the Internet. Computing device 110 may be a computer workstation, desktop computer, laptop computer, or any other computing device capable of being used in a networked environment. Server 130 may be a platform capable of connecting to computing device 110, database 160, and other devices (not shown).

Computing device 110 and server 130 may be capable of executing software (not shown), such as database management systems ("DBMS"), graphics and image processing software, and document processing and printing software. For example, documents may be pre-processed by computer 110 and/or server 170 prior to being sent to printer 170. Database 160 may be coupled to server 130 and may also be coupled to and accessible over network 140. For example, computer 110 may be able to access database 160 over network 140.

Exemplary printer 170 includes devices that produce physical documents from electronic data including, but not limited to, laser printers, ink-jet printers, LED printers. Exemplary printer 170 may take the form of a plotter, facsimile machine, multi-function device, and/or a digital copier. In some embodiments, printer 170 may also be capable of directly printing documents received from computing device 110 or server 130 over connection 120. In some embodiments such an arrangement may allow for the direct printing of documents, with (or without) prior pre-processing by computing device 110 or server 130. In some embodiments, documents may contain one or more of text, graphics, and images.

Printer 170 may include one or more of a CPU, firmware, memory, input-output ports, print engine, and secondary storage device. Printer 170 may also contain other Application Specific Integrated Circuits (ASICs), and/or Field Programmable Gate Arrays (FPGAs). In some embodiments, printer 170 may also be capable of executing software including a printer operating system and other appropriate application software. Printer memory and/or firmware may hold instructions and data including but not limited to a boot-up sequence, pre-defined routines including routines for managing data in containers, memory management routines, and other code. Routines may include code to translate page descriptions received from computing device 110 to DLs. In some embodiments, printer 170 may receive PDL descriptions of documents for printing. Note, too, that document print processing can be distributed. Thus, computing device 110, server 130, and/or the printer may perform portions of document print processing such as half-toning, color matching, and/or other manipulation processes before a document is physically printed by printer 170.

Computing device 110 and printer 170 may also contain removable media drives such as removable media drive 150. Removable media drive 150 may include, for example, solid state drives, portable hard disks, CD-ROM drives, DVD ROM drives, CD±RW or DVD±RW drives, USB™ flash drives, memory card readers, and/or any other removable media drives consistent with disclosed embodiments. In some embodiments, portions of the software application may reside on removable media and be read and executed by computing device 110 or printer 170.

Connection 120 couples computing device 110, server 130, and printer 170 and may be implemented as a wired or wireless connection using conventional communication protocols and/or data port interfaces. In general, connections 120 can be any communication channel that allows transmission of data between the devices. In one embodiment, for example, the devices may be provided with conventional data ports, such as parallel ports, serial ports, Ethernet, USB™, SCSI, FIREWIRE™, and/or coaxial cable ports for transmission of data through the appropriate connection. The communication links could be wireless links or wired links or any combination consistent with disclosed embodiments that allows communication between the various devices.

Network 140 could include a Local Area Network (LAN), a Wide Area Network (WAN), or the Internet. Printer 170 may be connected to network 140 through connection 120. In some embodiments, printer 170 may also be connected directly to computing device 110 and/or server 130. System 100 may also include other peripheral devices (not shown), according to some embodiments. A computer software application consistent with the disclosed embodiments may be deployed on any of the exemplary computers and/or printers, as shown in FIG. 1. For example, computing device 110 could execute software that may be downloaded directly from server 130. Portions of the application may also be executed by printer 170 in accordance with disclosed embodiments. Note that components of system 100 may be physically distributed or integrated into a single apparatus.

In one embodiment, computing device 110 may transform document data into a first printable data, which can take the form of a PDL description of a document. Then, the first printable data can be sent to printer 170 for transformation into intermediate printable data, which can take the form of a container such as a DL. Printer 170 may transform intermediate printable data into a final form of printable data and print according to this final form, which may take the form of a pixmap. In some embodiments, the display list may reside in memory on one or more of printer 170, computing device 110, and server 130. In another embodiment, computer 110 may hold various data items in a record, and selected data items from the record may be added to a container, prior to being written to database 160 by routines associated with the DBMS. In some embodiments, memory allocated to store objects in containers such as display lists may be dynamically allocated and released.

Figure 2:
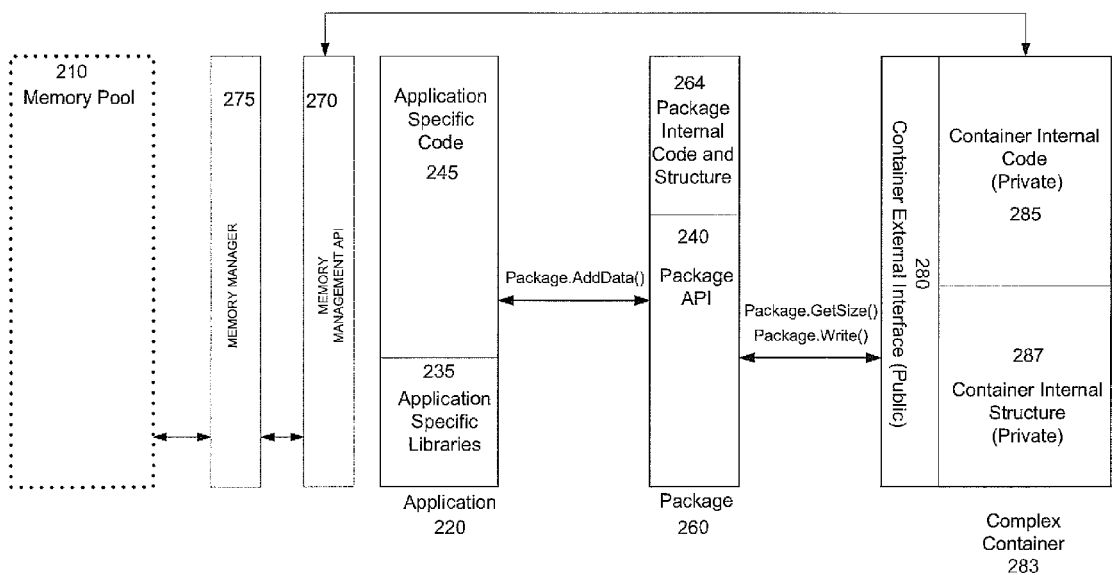
FIG. 2 shows an exemplary high-level software architecture of an exemplary system to add objects to a complex container.

FIG. 2 shows an exemplary high-level software architecture 200 of an exemplary system to add objects to complex container 283. Architecture 200 may permit one or more components shown in FIG. 2 to be modified internally with minimal or no modifications to other components.

On one hand, in accordance with disclosed embodiments, architecture 200 permits memory in memory pool 210 to be allocated and released using memory manager 275. For example, memory manager 275 can allocate memory in blocks to prevent memory fragmentation and can abstract away implementation details pertaining to memory management through memory management Application Programming Interface ("API") 270. In some embodiments, memory manager 275 may permit the sharing of memory pool across several sub-applications of application 220. For example, if application 220 takes the form of a print processing application, then memory manager may permit memory in memory pool 210 to be shared between display list code and framebuffer management code.

In one embodiment, routines in memory manager 275 may manage some subset of available memory as memory pool 210 and allocate memory from memory pool 210 to requesting processes through memory management API 270. When memory is no longer needed by the requesting processes, the memory may be de-allocated and returned to memory pool 210, where it can be made available to other processes. Thus, exemplary memory manager 270 may also provide various other memory management functions, including routines to free memory, routines to recover memory, and swapping routines that can swap memory to secondary storage.

On the other hand, application 220, which can comprise application specific code 245 and application library 235, may allow application data to be viewed logically as an integral unit while permitting application data to occupy discontiguous memory blocks allocated from memory pool 210 by leveraging the functionality provided by memory manager 275 through memory management API 270. Application 220 may take various forms, including, but not limited to, a database management application, a graphics processing application, an image processing application and/or a print processing application. In situations where application 220 takes the form of a print processing application, then the print processing application may allow pixmaps in framebuffers to be physically distributed while permitting the pixmap to be viewed logically as an integral unit. The term pixmap (or pixel map), which is related to bitmap, is used to denote a raster image that can exist at a number of bit depths. A bitmap is a type of memory organization used to store digital images, in which each pixel is assigned a single bit (i.e. the pixel is either "on" or "off").

Additionally, application specific code 245 and application specific libraries 235 may use package API 240 associated with package 260 to add discrete objects to complex container 283 through container external interface 280. For example, as shown in FIG. 2, exemplary "package.AddData( )" function associated with package 260 may be used to specify data for addition to container 283. Package 260 may also comprise private package internal code and structure 264. Package API 240 may also include externally accessible functions such as "package.GetSize( )" and "package.Write( )", which may be used by functions associated with container external interface 280 to permit the addition of data items, which may occupy mutually discontiguous memory locations, to container 283 in a manner that guarantees both atomicity and serialization. These functions are described further in conjunction with the description of FIGS. 3 and 4 below.

In some embodiments, container external interface 280, may include functions that specify or use a minimum granularity in terms of data size for data to be added to the container. In addition, these functions may also specify that any data to be added to container 283, should appear serially in physically contiguous memory to guarantee serialization and to ensure atomicity of the transaction, respectively. Atomicity refers to the indivisibility of the transaction i.e. the entire operation on the data will either succeed or fail. Serialization refers to the property by which transaction data will appear, at least logically, in the order in which they were presented to the container.

In some embodiments, container external interface may be enhanced by the addition of additional functionality that facilitates the addition of portions of objects or multiple objects—which may occupy mutually discontiguous memory locations—to container 283 in a manner that guarantees both atomicity and serialization. For example, in some implementations, the additional functionality provided by container external interface 280 may be made available through an additional externally accessible function—such as "container_addPackage( )" described below.

Note that container 283 may have a complicated internal structure, comprising private container code 285 and private container structure 287, which may depend, in part, on the functions supported by complex container 283. Therefore, external or public interface 280 may be used to permit access to objects within complex container 283 and to permit the addition, deletion, and manipulation of data within complex container 283 without revealing internal or private details of the structure and code associated with container 283. Further, complex container 283 may comprise private container internal code 285 that operates on data in private container internal structure 287 based on parameters received by container external interface 280 from package API 240.

In some embodiments, after data has been successfully added to container 283, container external interface 280 may return a "success" code to package API 240. If the transaction fails, a "failure" code may be returned and package API 240 may take appropriate corrective action based on the nature of the failure. Architecture 200 allows container 283 to manage internal structural and organizational complexities and request and release memory as needed from memory manager 275 through memory management API 270. Finally, memory manager 275 can focus on managing memory resources in memory pool 210 and preventing fragmentation by allocating and releasing memory in blocks or multiples of block units.

In some embodiments, package API 240 may also include routines to permit access to enhanced functionality provided by container external interface 280. The enhanced functionality may permit the addition of portions of objects or multiple objects—which may occupy mutually discontiguous memory locations—to container 283 in a manner that guarantees both atomicity and serialization.

Figure 3:
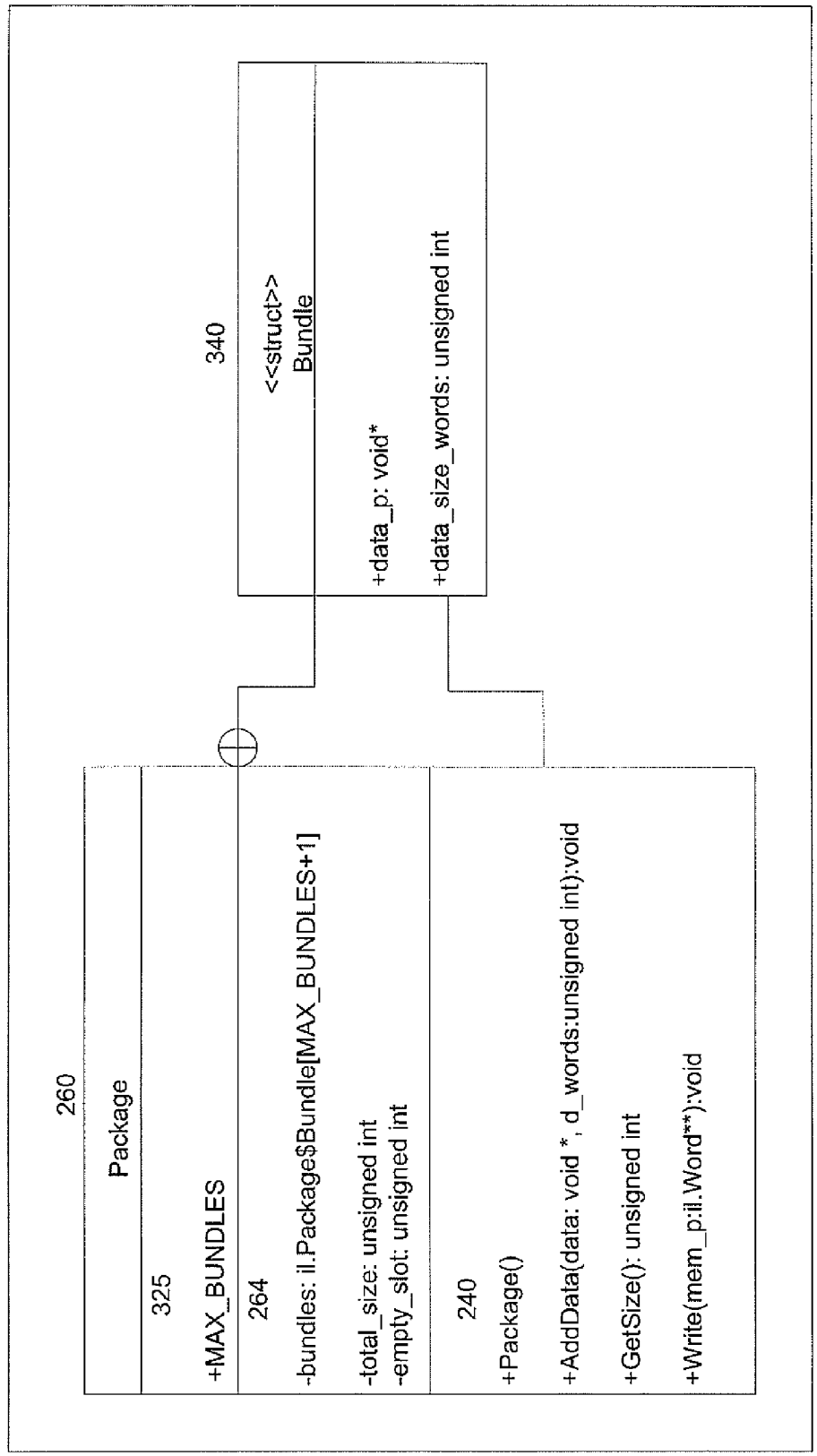
FIG. 3 shows high level exemplary schema for a portion of an intermediate package construct to facilitate the addition of portions of objects or multiple objects—which may occupy discontiguous memory locations—to a container in a manner that guarantees both atomicity and serialization.

FIG. 3 shows high level exemplary schema 300 for a portion of an intermediate package construct (hereinafter "package") 260 to facilitate the addition of portions of objects or multiple objects—which may occupy mutually discontiguous memory locations—to container 283 in a manner that guarantees both atomicity and serialization.

In some embodiments, package 260, may comprise an array of pointers and integers, such as bundle 340. In some embodiments, a pointer (shown as data type void*) in bundle 340 can point to a contiguous portion of data, which can be added to container 283; and an integer (shown as data type unsigned int) in bundle 340, which is associated with the pointer, can hold the size of the portion of data pointed to by its associated pointer. For example, FIG. 3 shows exemplary bundle 340 as comprising pointers "data_p" with associated integers "data_size" words. The prefix "+" indicates that the fields/functions are public i.e. visible outside package 260, while the prefix "−" indicates that the fields/function are private and may form part of private package internal code and structure 264.

In addition, as shown in FIG. 3, package 260 can specify a maximum number of bundles 325, indicated by MAX_BUNDLES, that is supported by package 260. Package 260 can also include private section, comprising private internal code and structure 264, which are internal details not visible externally. Further, as shown in FIG. 3, package 260 can comprise Package API 240, which includes public such as AddData( ), GetSize( ), and Write( ), which may receive parameters and output results in accordance with the received parameters. For example, the function Package.GetSize( ) may be invoked to obtain the cumulative size of the data referenced by pointers in the pointer array. As another example, Package.Write( ) may be invoked with appropriate parameters to traverse the array of pointer-integer pairs in sequence and copy the specified number of bytes (indicated by data_size) from a specified memory location (indicated by data_p) to the destination memory location.

Figure 4:
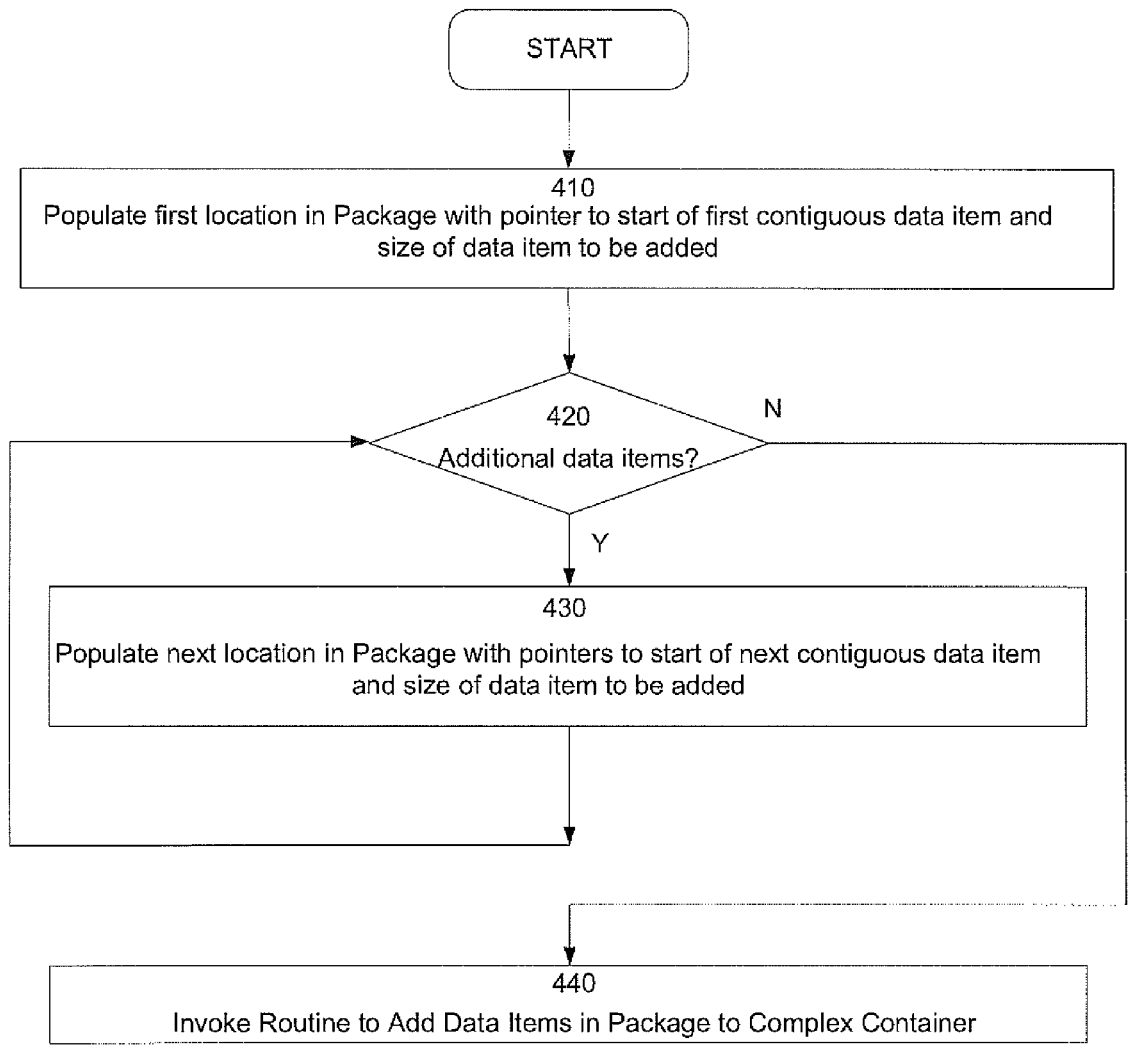
FIG. 4 shows an exemplary flowchart illustrating steps in a method to facilitate the addition of portions of objects or multiple objects—which may occupy discontiguous memory locations—to a container in a manner that guarantees both atomicity and serialization.

FIG. 4 shows an exemplary flowchart 400 illustrating steps in a method to facilitate the addition of portions of objects or multiple objects—which may occupy mutually discontiguous memory locations—to container 283 in a manner that guarantees both atomicity and serialization. In some embodiments, the method may use functionality afforded by package 260. In some embodiments, portions of flowchart 400 may be included in functionality provided by container API 245. In some embodiments, the method outlined in flowchart 400 may be invoked using a single function call.

After invocation, algorithm 400 may perform initialization where package 260 is instantiated. In step 410, a pointer-integer pair is assigned to the first data item. The data item may be contiguous piece of data from an object, or the first contiguous object that is to be added container 283. Note that while data item is contiguous, the plurality of data items need not be physically contiguous (i.e. they can be mutually discontiguous) with other data items. The pointer points to the start of the first data item, while the integer associated with the pointer indicates the size of the data item. In some embodiments, the pointer-integer pairs may correspond to the pointers and associated integers in bundle 340 of package 260.

In step 420, the algorithm checks whether there are additional data items that are to be added container 283. If there are additional data items ("Y" in step 420), the algorithm proceeds to step 430, where a pointer-integer pair is assigned to the next contiguous data item that is to be added container 283. The algorithm then iterates through step 420 and 430 until all data items ("N" in step 420) have been added to package 260. Then, in step 440, container external interface routine 280 may be invoked to add data items in package 260 to container 283.

In some embodiments, code associated with container external interface routine 280 may process package 260 by querying the total size of the data to be written from the package (for example by using Package→GetSize( )), requesting any additional memory from memory manager 275 through memory management API 270 as appropriate; allocating that memory (if any was requested and received); obtaining a pointer to the memory being used; and then having package write its contents to that memory location by invoking a publicly accessible external function such package→Write(mem_p), which can be part of public package API 240 of package 260. When a function such as package→Write(mem_p) is invoked, the array of pointer-integer pairs can be traversed in sequence and the specified number of bytes may be copied from the specified memory location to the destination memory location, which, in some instances, may be provided by private container internal code 285. Note that serialization can be guaranteed when the array of pointer-integer pairs is traversed in sequence.

Thus, container 283 is oblivious to the distribution of data being written to the container, application specific code 245 need not be concerned with details of the structure and organization of container 283. Further, the entire transaction in step 440 can occur through a single functional call, such as to exemplary container_AddPackage( ) above, which can guarantee the atomicity of the transaction because any memory requested from memory manager 275 is requested with knowledge of the total size of the data to be written from package 260, thereby ensuring that adequate memory is available prior to commencing the transaction.

Note that the embodiments described may be applicable to a variety of applications. For example, in a database management application, where serialization and atomicity are important, the methods described may used to write data to a complex containers associated with the DBMS in a manner that guarantees both atomicity and serialization. The disclosed methods and other embodiments, as would be apparent to one of ordinary skill in the art, may also be incorporated on computer readable media and//or computer readable memory. In some embodiments, the methods may be implemented in computer system 100 using one or more of computer 110, server 130, and/or printer 170.

Other implementations will be apparent to those skilled in the art from consideration of the specification and practice of disclosed embodiments. It is intended that the specification and examples be considered as exemplary only, with its true scope and spirit being indicated by the following claims.

What is claimed is:

1. A processor-implemented method for adding a plurality of individual data items from one or more applications to a complex container by using a package object, the method comprising:
    creating the package object, the package object comprising:
        an externally accessible array, comprising of pointer-integer pairs, wherein:
            each pointer points to the start of a memory location for an individual data item to be written into the complex container,
            elements of the individual data item occupy contiguous memory locations and the plurality of individual data items occupy mutually discontiguous memory locations, and
            each pointer is associated with an externally accessible integer that represents the size of the data item referenced by the pointer;
        an externally accessible size function for providing the cumulative size of the plurality of individual data items; and
        an externally accessible write function for writing the individual data items in sequence to the complex container, the sequence being determined by the order in which pointers that reference the data item appear in the array;
    enabling communications between the one or more applications and the package object for adding the plurality of individual data items to the complex container;
    determining a quantity of memory to hold the plurality of individual data items by invoking the externally accessible size function; and
    adding the plurality of individual data items to the complex container at locations supplied by an external interface of the complex container by invoking the externally accessible write function, if the memory available to hold the plurality of individual data items is not less than the determined quantity of memory.

2. The processor implemented method of claim 1, further comprising, returning a failure code, if the memory available to hold the plurality of data items is less than the determined quantity of memory.

3. The processor implemented method of claim 1, wherein each individual data item represents a distinct portion of an object.

4. The processor implemented method of claim 3, wherein the order in which the pointer-integer pairs appear in the array is determined by the order of the distinct portions within the object.

5. The processor implemented method of claim 1, wherein each individual data item represents a distinct object.

6. The processor implemented method of claim 1, wherein the method is implemented on a printer.

7. The processor implemented method of claim 6, wherein the complex container is a display list and each individual data item represents a distinct portion of a graphical object.

8. The processor-implemented method of claim 1, wherein the method is implemented using a single function call.

9. The processor-implemented method of claim 1, wherein the method is implemented in a database management system and the individual data items represent portions of a database record.

10. A non-transitory computer-readable medium that stores instructions, which when executed by a processor perform a method for adding a plurality of individual data items m one or more applications to a complex container by using a package object, the method comprising:
　creating the package object, the package object comprising:
　　an externally accessible array, comprising of pointer-integer pairs, wherein:
　　　each pointer points to the start of a memory location for an individual data item to be written into the complex container,
　　　elements of the individual data item occupy contiguous memory locations and the plurality of individual data items occupy mutually discontiguous memory locations, and
　　　each pointer is associated with an externally accessible integer that represents the size of the data item referenced by the pointer;
　　an externally accessible size function for providing the cumulative size of the plurality of individual data items; and
　　an externally accessible write function for writing the individual data items in sequence to the complex container, the sequence being determined by the order in which pointers that reference the data item appear in the array;
　enabling communications between the one or more applications and the package object for adding the plurality of individual data items to the complex container;
　determining a quantity of memory to hold the plurality of individual data items by invoking the externally accessible size function; and
　adding the plurality of individual data items to the complex container at locations supplied by an external interface of the complex container by invoking the externally accessible write function, if the memory available to hold the plurality of individual data items is not less than the determined quantity of memory.

11. The computer readable medium of claim 10, further comprising, returning a failure code, if the memory available to hold the plurality of data items is less than the determined quantity of memory.

12. The computer readable medium of claim 10, wherein each individual data item represents a distinct portion of an object.

13. The computer readable medium of claim 12, wherein the order in which the pointer-integer pairs appear in the array is determined by the order of the distinct portions within the object.

14. The computer readable medium of claim 10, wherein each individual data item represents a distinct object.

15. A non-transitory computer-readable memory that stores instructions, which when executed by a processor perform a method for adding a plurality of individual data items from one or more applications to a complex container by using a package object, the method comprising:
　creating the package object, the package object comprising:
　　an externally accessible array, comprising of pointer-integer pairs, wherein:
　　　each pointer points to the start of a memory location for an individual data item to be written into the complex container,
　　　elements of the individual data item occupy contiguous memory locations and the plurality of individual data items occupy mutually discontiguous memory locations, and
　　　each pointer is associated with an externally accessible integer that represents the size of the data item referenced by the pointer;
　　an externally accessible size function for providing the cumulative size of the plurality of individual data items; and
　　an externally accessible write function for writing the individual data items in sequence to the complex container, the sequence being determined by the order in which pointers that reference the data item appear in the array;
　enabling communications between the one or more applications and the package object for adding the plurality of individual data items to the complex container;
　determining a quantity of memory to hold the plurality of individual data items by invoking the externally accessible size function; and
　adding the plurality of individual data items to the complex container at locations supplied by an external interface of the complex container by invoking the externally accessible write function, if the memory available to hold the plurality of individual data items is not less than the determined quantity of memory.

16. The computer readable memory of claim 15, further comprising, returning a failure code, if the memory available to hold the plurality of data items is less than the determined quantity of memory.

17. The computer readable memory of claim 15, wherein each individual data item represents a distinct portion of an object.

18. The computer readable memory of claim 17, wherein the order in which the pointer-integer pairs appear in the array is determined by the order of the distinct portions within the object.

19. The computer readable memory of claim 15, wherein each individual data item represents a distinct object.

* * * * *